United States Patent
Yang et al.

(10) Patent No.: US 11,108,450 B2
(45) Date of Patent: Aug. 31, 2021

(54) BEAM MEASUREMENT METHOD AND APPARATUS

(71) Applicant: GUANGDONG OPPO MOBILE TELECOMMUNICATIONS CORP., LTD., Guangdong (CN)

(72) Inventors: Ning Yang, Dongguan (CN); Yanan Lin, Dongguan (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/344,638

(22) PCT Filed: Oct. 24, 2016

(86) PCT No.: PCT/CN2016/103036
§ 371 (c)(1),
(2) Date: Apr. 24, 2019

(87) PCT Pub. No.: WO2018/076132
PCT Pub. Date: May 3, 2018

(65) Prior Publication Data
US 2020/0067580 A1    Feb. 27, 2020

(51) Int. Cl.
*H04B 7/06* (2006.01)
*H04B 17/318* (2015.01)
*H04W 24/10* (2009.01)

(52) U.S. Cl.
CPC ......... *H04B 7/0617* (2013.01); *H04B 7/0695* (2013.01); *H04B 17/318* (2015.01); *H04W 24/10* (2013.01)

(58) Field of Classification Search
CPC .... H04W 16/28; H04B 7/0617; H04B 7/0695
See application file for complete search history.

(56) References Cited

U.S. PATENT DOCUMENTS

| 2005/0136963 | A1 | 6/2005 | Frank |
| 2009/0143073 | A1 | 6/2009 | Hovers |

(Continued)

FOREIGN PATENT DOCUMENTS

| CN | 104115419 A | 10/2014 |
| CN | 105430754 A | 3/2016 |

(Continued)

OTHER PUBLICATIONS

Supplementary European Search Report in European application No. 16919656.5, dated Sep. 25, 2019.

(Continued)

*Primary Examiner* — Raj Jain
(74) *Attorney, Agent, or Firm* — Ladas & Parry LLP

(57) ABSTRACT

Disclosed are a beam measurement method and apparatus. The method comprises: a terminal measuring at least one beam according to measurement configuration information, wherein the measurement configuration information is used for measuring the at least one beam; and the terminal determining a target beam and/or a target cell according to a measurement result of the at least one beam, wherein the target beam and/or the target cell is (are) a beam and/or a cell in which the terminal can reside. By a terminal determining a target beam and/or a target cell in which the terminal can reside according to a measurement result of at least one beam, a network side device is not required to determine the target beam and/or the target cell in which the terminal can reside for the terminal, thereby reducing the burden on the network side device.

17 Claims, 3 Drawing Sheets

(56) References Cited

U.S. PATENT DOCUMENTS

| | | | |
|---|---|---|---|
| 2009/0163167 | A1 | 6/2009 | Hillery |
| 2013/0155847 | A1 | 6/2013 | Li et al. |
| 2016/0150435 | A1* | 5/2016 | Baek .................... H04W 16/28 370/252 |
| 2016/0190707 | A1* | 6/2016 | Park ........................ H01Q 3/24 370/334 |
| 2016/0197659 | A1 | 7/2016 | Yu et al. |
| 2016/0219475 | A1 | 7/2016 | Kim |
| 2016/0241322 | A1 | 8/2016 | Son et al. |
| 2016/0262077 | A1 | 9/2016 | Zhang et al. |
| 2017/0034730 | A1* | 2/2017 | Zhang .................... H04L 43/16 |
| 2020/0028599 | A1* | 1/2020 | Zhang .................... H04B 7/08 |
| 2020/0067580 | A1* | 2/2020 | Yang ................... H04B 7/0695 |

FOREIGN PATENT DOCUMENTS

| | | |
|---|---|---|
| CN | 105453629 A | 3/2016 |
| CN | 105519167 A | 4/2016 |
| CN | 105684321 A | 6/2016 |
| CN | 106374984 A | 2/2017 |
| EP | 2988429 A1 | 2/2016 |
| EP | 3506524 A1 | 7/2019 |
| JP | 2014532320 A | 12/2014 |
| JP | 2015185955 A | 10/2015 |
| RU | 2595784 C2 | 8/2016 |
| WO | 2015065284 A1 | 5/2015 |
| WO | 2016013351 A1 | 1/2016 |
| WO | 2016018121 A1 | 2/2016 |
| WO | 2016107473 A1 | 7/2016 |

OTHER PUBLICATIONS

English translation of the Written Opinion of the International Search Authority in the international application No. PCT/CN2016/103036, dated May 31, 2017.

Samsung: "Discussion of NR Idle mode operation", 3GPP Draft; R2-166388 Discussion of NR Idle Mode Operation, 3rd Generation Partnership Project(3GPP), Mobile Competence Centre; 650, Route Des Lucioles; F-06921 Sophia-Antipolis Cedex; France, vol. RAN WG2, No. Kaohsiung, Taiwan; Oct. 10, 2016-Oct. 14, 2016(Oct. 9, 2016), XP051150946, Retrieved from the Internet: URL:http://www.3gpp.org/ftp/Meetings_3GPP_SYNC/RAN2/Docs/ <retrieved on Oct. 9, 2016> *sections 1-4; p. 2-page 3*.

Samsung: "Idle Mode Design for 5G Rat", 3GPP Draft; R2-164729 NR Idle Mode Design, 3rd Generation Partnership Project(3GPP), Mobile Competence Centre; 650, Route Des Lucioles; F-06921 Sophia-Antipolis Cedex; France, vol. RAN WG2, No. Gothenburg, Sweden; Aug. 22, 2016-Aug. 26, 2016 Aug. 21, 2016(Aug. 21, 2016), XP051126487, Retrieved from the Internet: URL:http://www.3gpp.org/ftp/Meetings_3GPP_SYNC/RAN2/Docs/ <retrieved on Aug. 21, 2016> *sections 2. 3*.

Huawei et al: "Idle mode support in NR", 3GPP Draft; R2-167005 Idle Mode Support in NR, 3rd Generation Partnership Project(3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016 Oct. 9, 2016(Oct. 9, 2016), XP051151414, Retrieved from the Internet: URL:http://www.3gpp.org/ftp/Meetings_3GPP_SYNC/RAN2/Docs/ <retrieved on Oct. 9, 2016> *sections 2.1*.

CATT: "NR cell for idle state", 3GPP Draft; R2-166125, 3rd Generation Partnership Project(3GPP), Mobile Competence Centre; 650, Route Des Lucioles; F-06921 Sophia-Antipolis Cedex; France, vol. RAN WG2, No. Kaohsiung; Oct. 10, 2016-Oct. 14, 2016 Oct. 9, 2016(Oct. 9, 2016), XP051150743, Retrieved from the Internet: URL:http://www.3gpp.org/ftp/Meetings_3GPP_SYNC/RAN2/Docs/ <retrieved on Oct. 9, 2016> *sections 2*.

International Search Report in international application No. PCT/CN2016/103036, dated May 31, 2017.

Written Opinion of the International Search Authority in international application No. PCT/CN2016/103036, dated May 31, 2017.

First Office Action of the Chilean application No. 201901120, dated Dec. 19, 2019.

Notice of Allowance of the Russian application No. 2019116095, dated Mar. 12, 2020.

First Office Action of the Chinese application No. 201680090359.X, dated Mar. 30, 2020.

First Office Action of the Singaporean application No. 11201903688X, dated May 19, 2020.

Notice of Allowance to be Issued of the Chilean application No. 201901120, dated Apr. 20, 2020.

Samsung. "Evaluation of beem-based RRM Measurement", 3GPP TSG-RAN WG2 Meeting #95bis R2-167157, published on Sep. 30, 2016.

Ericsson. "Summary of RAN2#95bis offline discussions on NR Cell definition and relation to beams in Connected mode", 3GPP TSG-RAN WG2 #95bis Tdoc R2-167285, published on Sep. 30, 2016.

Second Office Action of the Chinese application No. 201680090359.X, dated Jul. 29, 2020.

First Office Action of the Canadian application No. 3041553, dated Jun. 5, 2020.

First Office Action of the Russian application No. 2019116095, dated Dec. 6, 2019.

Third Office Action of the Chinese application No. 201680090359.X, dated Nov. 26, 2020.

Office Action of the Indian application No. 201917019452, dated Nov. 18, 2020.

First Office Action of the Japanese application No. 2019-521668, dated Oct. 20, 2020.

First Office Action of the Brazilian application No. BR1120190083022, dated Sep. 6, 2020.

Notice of Rejection of the Chinese application No. 201680090359.X, dated Feb. 9, 2021.

Office Action of the Taiwanese application No. 106130663, dated Feb. 8, 2021.

First Office Action of the European application No. 16919656.5, dated Mar. 29, 2021.

Second Office Action of the Canadian application No. 3041553, dated Mar. 16, 2021.

First Office Action of the Indonesian application No. P00201904455, dated Apr. 26, 2021.

Second Office Action of the Japanese application No. 2019-521668, dated Jul. 2, 2021.

Second Office Action of the Taiwanese application No. 106130663, dated May 20, 2021.

\* cited by examiner

BEAM MEASUREMENT METHOD AND APPARATUS

RELATED APPLICATION

This application is an application under 35 U.S.C. 371 of International Application No. PCT/CN2016/103036 filed on Oct. 24, 2016, the entire contents of which are incorporated herein by reference.

TECHNICAL FIELD

Embodiments of the disclosure relate to the field of communications, and more particularly, to a method and device for beam measurement.

BACKGROUND

In a Long Term Evolution (LTE) system, after a terminal accesses a cell, a network device to which the cell belongs allocates a beam suitable for data transmission of the terminal for the terminal and the network device may regulate beamforming of the beam according to position information of the terminal, thereby improving signal quality and/or signal strength for signal transmission of the terminal. However, when a large number of terminals access the network device, and are distributed in a wide range and move fast, adoption of only the method that the network device regulates beamforming to improve the signal transmission quality of the terminal may increase a burden of the network device.

SUMMARY

The disclosure provides a method and device for beam measurement, so as to reduce the phenomenon that a network device only regulates beamforming to improve signal transmission quality of a terminal to increase a burden of the network device.

In a first aspect, there is provided a method for beam measurement, which may include that: a terminal measures at least one beam according to measurement configuration information, here, the measurement configuration information is used in measuring the at least one beam; and the terminal determines at least one of a target beam where the terminal can camp or a target cell where the terminal can camp, according to a measurement quantity of the at least one beam.

The terminal determines at least one of the target beam or the target cell for camping on according to the measurement quantity of the at least one beam, so that a network device is not required to determine at least one of the target beam or target cell for camping on for the terminal and a burden of the network device is reduced.

In combination with the first aspect, in a possible implementation mode of the first aspect, the method may further include that: the terminal receives the measurement configuration information sent by a network device.

In combination with the first aspect or any abovementioned possible implementation mode, in a possible implementation mode of the first aspect, the at least one beam may belong to a same cell.

The terminal selects the target beam for camping from multiple beams in a cell according to the measurement quantity of the at least one beam in the cell, thereby improving quality of communication between the terminal and the network device.

In combination with the first aspect or any abovementioned possible implementation mode, in a possible implementation mode of the first aspect, the at least one beam may comprises multiple beams and the multiple beams may belong to multiple cells.

The terminal selects the target beam for camping from the multiple beams in the multiple cells according to measurement quantities of the multiple beams in different cells, thereby improving the quality of communication between the terminal and the network device.

In combination with the first aspect or any abovementioned possible implementation mode, in a possible implementation mode of the first aspect, the terminal determines the at least one of the target beam or the target cell according to the measurement quantity of the at least one beam may include that: the terminal determines measurement quantities of the multiple cells according to measurement quantities of the multiple beams; and the terminal determines the target cell from the multiple cells according to the measurement quantities of the multiple cells.

The terminal determines the measurement quantities of the cells to which the beams belong according to the measurement quantities of the beams and selects a cell in which the multiple beams have relatively high overall signal transmission quality as the target cell, so that the condition that when the target cell is determined only according to the measurement quantity of a certain beam, the overall signal transmission quality of the target cell to which the target beam selected by the terminal belongs is relatively low is avoided.

In combination with the first aspect or any abovementioned possible implementation mode, in a possible implementation mode of the first aspect, the method may further include that: the terminal determines the target beam from the beams in the target cell according to the measurement quantities of the beams in the target cell.

The terminal selects the target beam from the cell in which the multiple beams have relatively high overall signal transmission quality, so that the condition that when the target cell is determined only according to the measurement quantity of a certain beam, the overall signal transmission quality of the target cell to which the target beam selected by the terminal belongs is relatively low is avoided.

In combination with the first aspect or any abovementioned possible implementation mode, in a possible implementation mode of the first aspect, the method may further include that: the terminal determines at least one of: at least one backup beam where the terminal can camp when the target beam is not suitable or at least one backup cell where the terminal can camp when the target cell is not suitable, according to the measurement quantity of the at least one beam.

The terminal, when determining at least one of the target cell or the target beam, also determines at least one of the backup cell or the backup beam, thereby improving continuity of communication between the terminal and the network device.

In combination with the first aspect or any abovementioned possible implementation mode, in a possible implementation mode of the first aspect, the terminal determines the at least one of the target beam or the target cell according to the measurement quantity of the at least one beam may include that: the terminal determines the at least one of the target beam or the target cell according to at least one of signal strength or signal quality of the at least one beam.

In combination with the first aspect or any abovementioned possible implementation mode, in a possible implementation mode of the first aspect, the terminal determines the at least one of the target beam or the target cell according to the at least one of the signal strength or the signal quality of the at least one beam may include the following operations.

The terminal determines a beam, that has a maximum signal strength, of the at least one beam according to the signal strength of the at least one beam, here, the beam that has the maximum signal strength is the target beam. Or the terminal determines a beam, that has maximum signal quality, of the at least one beam according to the signal quality of the at least one beam, here, the beam that has the maximum signal quality is the target beam. Or the terminal determines a beam, that has maximum signal strength and signal quality, of the at least one beam according to the signal strength and the signal quality of the at least one beam, here, the beam that has the maximum signal strength and signal quality is the target beam.

In combination with the first aspect or any abovementioned possible implementation mode, in a possible implementation mode of the first aspect, the measurement configuration information may include at least one of: a frequency priority, a first signal strength threshold, a first signal quality threshold, a second signal strength threshold, or a second signal quality threshold, here, the frequency priority is used to indicate a priority of a frequency of a beam or of a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

In combination with the first aspect or any abovementioned possible implementation mode, in a possible implementation mode of the first aspect, the terminal determines the at least one of the target beam or the target cell according to the at least one of the signal strength or the signal quality of the at least one beam may include that: the terminal determines the at least one of the target beam or the target cell according to the at least one of the signal strength or the signal quality of the at least one beam, and at least one of the first signal strength threshold or the first signal quality threshold.

In combination with the first aspect or any abovementioned possible implementation mode, in a possible implementation mode of the first aspect, the terminal determines the at least one of the target beam or the target cell according to the at least one of the signal strength or the signal quality of the at least one beam, and the at least one of the first signal strength threshold or the first signal quality threshold may include the following operations.

The terminal determines at least one of a cell set or a beam set according to the signal strength of the at least one beam and the first signal strength threshold; and the terminal determines a cell, that has a maximum signal strength, in the cell set the target cell, or determines a cell, that has a beam with a maximum signal strength, in the cell set as the target cell, or determines a beam, that has a maximum signal strength, in the beam set as the target beam. Or the terminal determines at least one of a cell set or a beam set according to the signal quality of the at least one beam and the first signal quality threshold; and the terminal determines a cell, that has maximum signal quality, in the cell set as the target cell, or determines a cell, that has a beam with maximum signal quality, in the cell set as the target cell, or determines a beam, that has maximum signal quality, in the beam set as the target beam. Or the terminal determines at least one of a cell set or a beam set according to the signal strength and the signal quality of the at least one beam, and the first signal strength threshold and the first signal quality threshold; and the terminal determines a cell, that has maximum signal strength and signal quality, in the cell set as the target cell, or determines a cell, that has a beam with maximum signal strength and signal quality, in the cell set as the target cell, or determines a beam, that has maximum signal strength and signal quality, in the beam set as the target beam.

In combination with the first aspect or any abovementioned possible implementation mode, in a possible implementation mode of the first aspect, the terminal determines the at least one of the target beam or the target cell according to the at least one of the signal strength or the signal quality of the at least one beam, and the at least one of the first signal strength threshold or the first signal quality threshold may include the following operations.

The terminal determines a cell set or a beam set according to the signal strength of the at least one beam and the first signal strength threshold; and the terminal sorts cells in the cell set according to a criterion and determines the target cell according to a sorting result, or the terminal sorts beams in the beam set according to a criterion and determines the target beam according to a sorting result. Or the terminal determines a cell set or a beam set according to the signal quality of the at least one beam and the first signal quality threshold; and the terminal sorts cells in the cell set according to a criterion and determines the target cell according to a sorting result, or the terminal sorts beams in the beam set according to a criterion and determines the target beam according to a sorting result. Or the terminal determines a cell set or a beam set according to the signal strength and the signal quality of the at least one beam, and the first signal strength threshold and the first signal quality threshold; and the terminal sorts cells in the cell set according to a criterion and determines the target cell according to a sorting result, or the terminal sorts beams in the beam set according to a criterion and determines the target beam according to a sorting result.

In combination with the first aspect or any abovementioned possible implementation mode, in a possible implementation mode of the first aspect, the terminal determines the at least one of the target beam or the target cell according to the at least one of the signal strength or the signal quality of the at least one beam, and the at least one of the first signal strength threshold or the first signal quality threshold may include the following operations.

The terminal determines a cell set or a beam set according to the signal strength of the at least one beam and the first signal strength threshold; and the terminal determines the target cell from the cell set according to frequency priorities or determines the target beam from the beam set according to frequency priorities, here, the frequency priorities are used to indicate frequency priorities of frequencies of the cells or frequency priorities of frequencies of the beams. Or the terminal determines a cell set or a beam set according to the signal quality of the at least one beam and the first signal quality threshold; and the terminal determines the target cell from the cell set according to frequency priorities or determines the target beam from the beam set according to frequency priorities, here, the frequency priorities are used to indicate frequency priorities of frequencies of the cells or frequency priorities of frequencies of the beams. Or the terminal determines a cell set or a beam set according to the signal strength and the signal quality of the at least one beam, and the first signal strength threshold and the first signal quality threshold; and the terminal determines the target cell from the cell set according to frequency priorities or determines the target beam from the beam set according to frequency priorities, here, the frequency priorities is used to indicate frequency priorities of frequencies of the cells or frequency priorities of frequencies of the beams.

In combination with the first aspect or any abovementioned possible implementation mode, in a possible implementation mode of the first aspect, the method may further include the following operations.

Before the terminal determines the measurement quantity of the at least one beam, the terminal determines that a signal strength of a cell serving the terminal is less than the second signal strength threshold, or that signal quality of a cell serving the terminal is less than the second signal quality threshold, or that a signal strength of a cell serving the terminal is less than the second signal strength threshold and signal quality of a cell serving the terminal is less than the second signal quality threshold, or the terminal determines that a signal strength of a beam serving the terminal is less than the second signal strength threshold, or that signal quality of a beam serving the terminal is less than the second signal quality threshold, or that a signal strength of a beam serving the terminal is less than the second signal strength threshold and signal quality of a beam serving the terminal is less than the second signal quality threshold.

In combination with the first aspect or any abovementioned possible implementation mode, in a possible implementation mode of the first aspect, the terminal receives the measurement configuration information of the at least one beam sent by the network device may include that: the terminal receives dedicated signaling sent by the network device, here, the dedicated signaling includes the measurement configuration information of each of the at least one beam.

In combination with the first aspect or any abovementioned possible implementation mode, in a possible implementation mode of the first aspect, the terminal receives the measurement configuration information of the at least one beam sent by the network device may include that: the terminal receives system information sent by the network device, here, the system information includes the measurement configuration information of each of the at least one beam.

In a second aspect, there is provided a method for beam measurement, which may include that: a network device sends measurement configuration information of at least one beam to a terminal, here, the measurement configuration information is used in measuring the at least one beam; and the network device sends information through at least one of a target beam where the terminal can camp or a target cell where the terminal can camp, here, the at least one of the target beam or the target cell is determined according to a measurement quantity, obtained by measurement of the at least one beam by the terminal according to the measurement configuration information of the at least one beam, of the at least one beam.

The terminal determines at least one of the target beam or target cell for camping according to the measurement quantity of the at least one beam, so that the network device is not required to determine at least one of the target beam or target cell for camping for the terminal and a burden of the network device is reduced.

In combination with the second aspect, in a possible implementation mode of the second aspect, the at least one beam may belong to a same cell.

The terminal selects the target beam for camping from multiple beams in a cell according to the measurement quantity of the at least one beam in the same cell, thereby improving quality of communication between the terminal and the network device.

In combination with the second aspect or any abovementioned possible implementation mode, in a possible implementation mode of the second aspect, the at least one beam may comprises multiple beams and the multiple beams may belong to multiple cells.

The terminal selects the target beam for camping from the multiple beams in the multiple cells according to measurement quantities of the multiple beams in different cells, thereby improving the quality of communication between the terminal and the network device.

In combination with the second aspect or any abovementioned possible implementation mode, in a possible implementation mode of the second aspect, the measurement configuration information may include at least one of: a frequency priority, a first signal strength threshold, a first signal quality threshold, a second signal strength threshold, or a second signal quality threshold, here, the frequency priority is used to indicate a priority of a frequency of a beam or of a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

In combination with the second aspect or any abovementioned possible implementation mode, in a possible implementation mode of the second aspect, the network device sends the measurement configuration information of the at least one beam to the terminal may include that: the network device sends dedicated signaling to the terminal, here, the dedicated signaling includes the measurement configuration information of the at least one beam.

In combination with the second aspect or any abovementioned possible implementation mode, in a possible implementation mode of the second aspect, the network device sends the measurement configuration information of the at least one beam to the terminal may include that: the network device sends system information to the terminal, here, the system information includes the measurement configuration information of the at least one beam.

In a third aspect, there is provided a device for beam measurement, which includes modules configured to execute the method in the first aspect.

In a fourth aspect, there is provided a device for beam measurement, which includes modules configured to execute the method in the second aspect.

In a fifth aspect, there is provided a device for beam measurement, which includes a memory, a processor, an input/output interface, a communication interface and a bus system. The memory, the processor, the input/output interface and the communication interface are connected through the system bus. The memory is configured to store an instruction that, when is executed by the processor, cause the processor to implement the method in the first aspect through the communication interface and control the input/ output interface to receive input data and information and to output data such as an operation result.

In a sixth aspect, there is provided a device for beam measurement, which includes a memory, a processor, an input/output interface, a communication interface and a bus system. The memory, the processor, the input/output interface and the communication interface are connected through the system bus. The memory is configured to store an instruction that, when executed by the processor, cause the processor to implement the method in the second aspect through the communication interface and control the input/output interface to receive input data and information and to output data such as an operation result.

In a seventh aspect, there is provided a computer-readable storage medium, which is configured to store a program code for a search request sending method, the program code is configured to execute a method instruction in the first aspect.

In an eighth aspect, there is provided a computer-readable storage medium, which is configured to store a program code for a search request sending method, the program code is configured to execute a method instruction in the second aspect.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the disclosure may be applied to various communication systems, for example, a Global System of Mobile Communication (GSM), a Code Division Multiple Access (CDMA) system, Wideband Code Division Multiple Access (WCDMA) system, a General Packet Radio Service (GPRS), LTE and 5th-Generation (5G) New Radio (NR).

It is also to be understood that a terminal may be called User Equipment (UE), may also be called a mobile terminal, a mobile user device and the like and may communicate with one or more core networks through a Radio Access Network (RAN). The UE may be a mobile terminal, for example, a mobile phone (or called a "cellular" phone) and a computer with a mobile terminal, may be, for example, a portable, pocket, handheld, computer-embedded or vehicle-mounted mobile device and performs language and/or data exchange with the RAN.

It is also to be understood that a network device may be a device, for example, a network device, configured to communicate with a mobile device. The network device may be an Access Point (AP) in a Wireless Local Area Network (WLAN), a Base Transceiver Station (BTS) in the GSM or CDMA, may also be a NodeB (NB) in WCDMA, and may further be an Evolutional Node B (eNB or eNodeB) in LTE, or a relay station or AP, or a vehicle-mounted device, a wearable device, a network device in a future 5G network, a network device in a future evolved Public Land Mobile Network (PLMN) or the like.

For convenient comprehension, an application scenario of a method for beam measurement according to the embodiments of the disclosure will be introduced at first.

Figure 1:
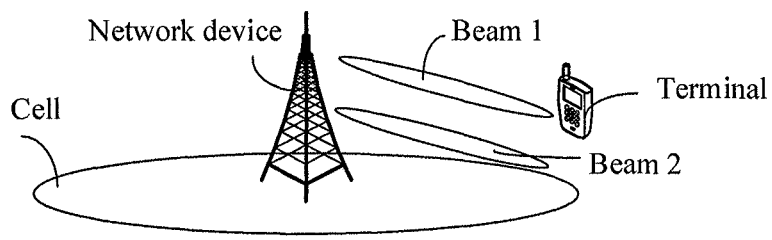
FIG. 1 is a schematic diagram of an application scenario of a method for beam measurement according to an embodiment of the disclosure.

FIG. 1 is a schematic diagram of an application scenario of a method for beam measurement according to an embodiment of the disclosure. From the application scenario illustrated in FIG. 1, it can be seen that in a cell, there may exist a beam (not illustrated in FIG. 1) configured for signaling transmission of a control channel and multiple beams (referring to a beam 1 and beam 2 in FIG. 1) configured for data transmission of a data channel. That is, in the cell, the whole cell may be covered by a "wide beam" configured for signaling transmission of the control channel and the whole cell may be covered by multiple "narrow beams" configured for signaling transmission of the data channel.

Figure 2:
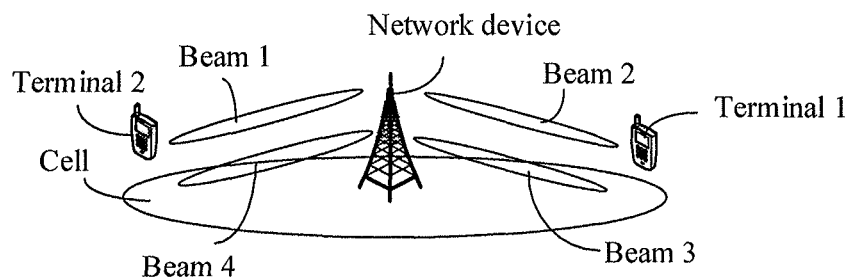
FIG. 2 is a schematic diagram of an application scenario of a method for beam measurement according to another embodiment of the disclosure.

FIG. 2 is a schematic diagram of an application scenario of a method for beam measurement according to another embodiment of the disclosure. From the application scenario illustrated in FIG. 2, it can be seen that there may exist multiple "narrow beams" (referring to a beam 1 and beam 2 in FIG. 2) configured for control signaling transmission of a control channel in a cell and there may also exist multiple "narrow beams" (referring to a beam 3 and beam 4 in FIG. 2) configured for data transmission of a data channel. A terminal 1 may interact with a network device about control signaling through the beam 2, the terminal 1 may perform data transmission with the network device through the beam 3, a terminal 2 may interact with the network device about the control signaling through the beam 1 and the terminal 2 may perform data transmission with the network device through the beam 4. That is, the terminals in an idle state, when performing signaling interaction with a base station, may perform signaling interaction with the network device through the "narrow beams" configured for control signaling transmission of the control channel. The terminals may also perform data transmission with the network device through the "narrow beams" configured for data transmission of the data channel. The beams configured for control signaling transmission of the control channel between the terminals and the network device and the beams configured for data transmission of the data channel between the terminal and the network device may be the same beams and may also be different beams. It is to be understood that FIG. 2 only illustrates the condition that the beams configured for control signaling transmission of the control channel between the terminals and the network device and the beams configured for data transmission of the data channel between the terminals and the network device are different as an example.

It is to be noted that at least one of signal quality or signal strength for signal transmission between the terminal and the network device may be improved by use of a relatively high forming gain of a "narrow beam" relative to a "wide beam".

Figure 3:
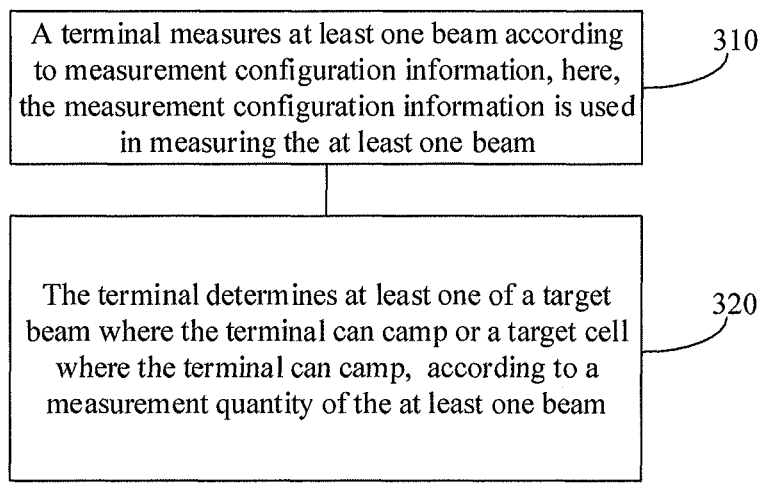
FIG. 3 is a schematic flowchart of a method for beam measurement according to an embodiment of the disclosure.

FIG. 3 is a schematic flowchart of a method for beam measurement according to an embodiment of the disclosure. It is to be understood that the method illustrated in FIG. 3 may be applied to the application scenarios illustrated in FIG. 1 and FIG. 2 and may also be applied to another application scenario and there are no specific limits made thereto in the embodiment of the disclosure. The method illustrated in FIG. 3 includes the following operations.

In 310, a terminal measures at least one beam according to measurement configuration information, here, the measurement configuration information is used in measuring the at least one beam.

Specifically, the at least one beam may be at least one of a beam configured for signaling transmission of a control channel or a beam configured for data transmission of a data channel. Furthermore, the beam configured for signaling transmission of the control channel and the beam configured for data transmission of the data channel may be the same beam and the beam configured for signaling transmission of the control channel and the beam configured for data transmission of the data channel may also be different beams.

The terminal may be a terminal in an idle state, which may refer to that there is no Non-Access Stratum (NAS) or Access Stratum (AS) signaling connection established between the terminal and a network device.

It is to be understood that the at least one beam may correspond to a piece of measurement configuration information. For example, the at least one beam measured by the terminal may include a beam 1, a beam 2 and a beam 3 and the beam 1, the beam 2 and the beam 3 may correspond to a piece of measurement configuration information, that is, the measurement configuration information may include a beam Identifier (ID) of the beam 1, a beam ID of the beam 2 and a beam ID of the beam 3. If the measurement configuration information is at least one piece of measurement configuration information, the at least one beam and the at least one piece of measurement configuration information may form a one-to-one correspondence, that is, each piece of measurement configuration information may include a beam ID of a beam to be measured.

Optionally, the at least one beam may belong to a same cell and the at least one beam may also belong to different cells.

For example, when the at least one beam includes multiple beams, part of beams of the at least one beam may belong to the same cell (for example, a first cell) and the beams, except the beams belonging to the first cell, of the at least one beam may belong to another cell (for example, a second cell). The first cell may be an adjacent cell of the second cell.

Optionally, the measurement configuration information may include: a measurement ID and the measurement ID corresponds to a measurement object ID (for example, a beam ID); a measurement quantity configuration used to indicate a measurement quantity; a frequency priority used to indicate a priority of a frequency of a beam or of a frequency of a cell; a second signal strength threshold used to indicate a threshold at which the terminal starts measuring a beam; and a second signal quality threshold used to indicate a threshold at which the terminal starts measuring a beam.

It is to be noted that the measurement configuration information is measurement configuration information for beam measurement, like measurement configuration information for cell measurement in the related art, and information contents related to a cell in the cell measurement configuration information may be configured into information contents related to a beam. For example, a serving cell quality threshold in the cell measurement configuration information may be configured into a serving beam quality threshold.

Optionally, the measurement configuration information may also include configuration information related to the beamforming. For example, the measurement configuration information may include information of a beam transmitting antenna port number and the like.

In 320, the terminal determines at least one of a target beam where the terminal can camp or a target cell where the terminal can camp, according to a measurement quantity of the at least one beam.

Specifically, each beam corresponds to a cell. After the terminal determines the target beam for camping, a cell to which the beam belongs is also determined, and the cell is the target cell.

The measurement quantity of the at least one beam may refer to that the measurement quantity includes a measurement quantity of each of the at least one beam and may also refer to that the at least one beam corresponds to at least one measurement quantity one to one. There are no specific limits made thereto in the disclosure.

Optionally, as an embodiment, the method illustrated in FIG. 3 further includes that: the terminal receives the measurement configuration information sent by a network device.

It is to be understood that the measurement configuration information may be sent to the terminal by the network device and may also be measurement configuration information in a measurement configuration database maintained by the terminal. There are no specific limits made to a measurement configuration information acquisition manner for the terminal in the embodiment of the disclosure.

Optionally, the terminal receives the measurement configuration information of each of the at least one beam sent by the network device includes that: the terminal receives dedicated signaling sent by the network device, here, the dedicated signaling includes the measurement configuration information of each of the at least one beam.

Optionally, the operation that the terminal receives the measurement configuration information of each of the at least one beam sent by the network device includes that: the terminal receives system information sent by the network device, here, the system information includes the measurement configuration information of each of the at least one beam.

Optionally, as an embodiment, the terminal determines the at least one of the target beam or the target cell according to the measurement quantity of the at least one beam includes that: the terminal determines measurement quantities of multiple cells according to measurement quantities of multiple beams; and the terminal determines the target cell from the multiple cells according to the measurement quantities of the multiple cells.

Specifically, the measurement quantity of each of the multiple cells is determined on the basis of the measurement quantities of the beams in the cell. The measurement quantity of a cell may be obtained based on weighted averaging or linear averaging of the measurement quantities of the multiple beams in the cell. When measuring the beams, the terminal may determine a cell where a first beam of which the measurement quantity meets a configured threshold is located as the target cell (this strategy could be only applied to initial selection of the target cell by the terminal). After beam measurement is performed, the terminal may also determine a cell where a beam with an optimal measurement quantity is located as the target cell. After beam measurement is performed, the terminal may also determine a cell with a highest percent of beams of which the measurement quantities meet the threshold as the target cell or determine a cell with a highest number of beams of which the measurement quantities meet the threshold as the target cell. It is to be understood that there are no specific limits made to a manner for determining the measurement quantities of the cells according to the measurement qualities of the multiple beams in the embodiment of the disclosure.

For example, measurement quantities corresponding to n beams in a cell 1 are $Q_1, Q_2, Q_3, \ldots, Q_n$ respectively and then a measurement quantity of the cell 1 is $$\frac{(Q_1 + Q_2 + Q_3 + \ldots + Q_n)}{n}.$$

The measurement quantities corresponding to the n beams in the cell 1 are $Q_1, Q_2, Q_3 \ldots Q_n$ respectively and then the measurement quantity of the cell 1 is $$\frac{(a_1 \times Q_1 + a_2 \times Q_2 + a_3 \times Q_3 + \ldots + a_n \times Q_n)}{n},$$

where $a_1, a_2, a_3 \ldots a_n$ represent a weight of each beam in the cell 1.

It is to be noted that the weights may be configured for the terminal by the network device and may also be maintained by the terminal. There are no specific limits made thereto in the disclosure.

Optionally, as an embodiment, the method further includes that: the terminal determines the target beam from the beams in the target cell according to the measurement quantities of the beams in the target cell.

Specifically, the terminal, after determining the target cell, may select a beam with an optimal measurement quantity from the beams in the target cell as the target beam, may also randomly select a beam from multiple beams of which the measurement quantities are higher than a measurement quantity threshold as the target beam and may also directly randomly select a beam from the target cell as the target beam. There are no specific limits made thereto in the embodiment of the disclosure.

Optionally, as an embodiment, the method further includes that: the terminal determines at least one of: at least one backup beam where the terminal can camp when the target beam is not suitable or at least one backup cell where the terminal can camp when the target cell is not suitable, according to the measurement quantity of the at least one beam.

Optionally, as an embodiment, the terminal determines the at least one of the target beam or the target cell according to the measurement quantity of the at least one beam includes that: the terminal determines the at least one of the target beam or the target cell according to at least one of signal strength or signal quality of the at least one beam.

It is to be understood that the measurement quantity of the beam may refer to at least one of the signal strength or the signal quality of the beam and may also refer to at least one of processed signal strength or signal quality of the beam. For example, the measurement quantity of the beam may refer to addition of an offset to at least one of the signal strength or the signal quality of the beam and the like. There are no limits made to a specific presentation form of the measurement quantity in the disclosure.

Optionally, as an embodiment, the terminal determines the at least one of the target beam or the target cell according to the at least one of the signal strength or the signal quality of the at least one beam includes the following operations.

The terminal determines a beam, that has a maximum signal strength, of the at least one beam according to the signal strength of the at least one beam, here, the beam that has the maximum signal strength is the target beam. Or the terminal determines a beam, that has maximum signal quality, of the at least one beam according to the signal quality of the at least one beam, here, the beam that has the maximum signal quality is the target beam. Or the terminal determines a beam, that has maximum signal strength and signal quality, of the at least one beam according to the signal strength and the signal quality of the at least one beam, here, the beam that has the maximum signal strength and signal quality is the target beam.

Optionally, as an embodiment, the terminal determines the at least one of the target beam or the target cell according to the at least one of the signal strength or the signal quality of the at least one beam includes that: the terminal determines the at least one of the target beam or the target cell according to the at least one of the signal strength or the signal quality of the at least one beam, and at least one of the first signal strength threshold or the first signal quality threshold.

It is to be understood that at least one of the first signal strength threshold or the first signal quality threshold may be preset and may also be configured for the terminal by the network device. At least one of the first signal strength threshold or the first signal quality threshold may also be sent to the terminal by the network device through the measurement configuration information. There are no specific limits made thereto in the disclosure.

Optionally, as an embodiment, the terminal determines the at least one of the target beam or the target cell according to the at least one of the signal strength or the signal quality of the at least one beam, and the at least one of the first signal strength threshold or the first signal quality threshold includes the following operations The terminal determines a cell set or a beam set according to the signal strength of the at least one beam and the first signal strength threshold; and the terminal determines the target cell from the cell set according to cell priorities, or the terminal determines the target beam from the beam set according to beam priorities. Or the terminal determines a cell set or a beam set according to the signal quality of the at least one beam and the first signal quality threshold; and the terminal determines the target cell from the cell set according to cell priorities, or the terminal determines the target beam from the beam set according to beam priorities. Or the terminal determines a cell set or a beam set according to the signal strength and the signal quality of the at least one beam, and the first signal strength threshold and the first signal quality threshold; and the terminal determines the target cell from the cell set according to cell priorities, or the terminal determines the target beam from the beam set according to beam priorities.

Optionally, as an embodiment, the terminal determines the at least one of the target beam or the target cell according to the at least one of the signal strength or the signal quality of the at least one beam, and the at least one of the first signal strength threshold or the first signal quality threshold includes the following operations.

The terminal determines a cell set or a beam set according to the signal strength of the at least one beam and the first signal strength threshold; and the terminal determines the target cell from the cell set according to frequency priorities or determines the target beam from the beam set according to frequency priorities, here, the frequency priorities are used to indicate frequency priorities of frequencies of the cells or frequency priorities of frequencies of the beams. Or the terminal determines a cell set or a beam set according to the signal quality of the at least one beam and the first signal quality threshold; and the terminal determines the target cell from the cell set according to frequency priorities or determines the target beam from the beam set according to frequency priorities, here, the frequency priorities are used to indicate frequency priorities of frequencies of the cells or frequency priorities of frequencies of the beams. Or the terminal determines a cell set or a beam set according to the signal strength and the signal quality of the at least one beam and the first signal strength threshold and the first signal quality threshold; and the terminal determines the target cell from the cell set according to frequency priorities or determines the target beam from the beam set according to frequency priorities, here, the frequency priorities is used to indicate frequency priorities of frequencies of the cells or frequency priorities of frequencies of the beams.

Optionally, as an embodiment, the terminal determines the at least one of the target beam or the target cell according to the at least one of the signal strength or the signal quality of the at least one beam, and the at least one of the first signal strength threshold or the first signal quality threshold includes the following operations.

The terminal determines a cell set or a beam set according to the signal strength of the at least one beam and the first signal strength threshold; and the terminal determines a cell, that has a maximum signal strength, in the cell set as the target cell, or determines a cell, that has a beam with a maximum signal strength, in the cell set as the target cell, or determines a beam, that has a maximum signal strength, in the beam set as the target beam. Or the terminal determines a cell set or a beam set according to the signal quality of the at least one beam and the first signal quality threshold; and the terminal determines a cell, that has maximum signal quality, in the cell set as the target cell, or determines a cell, that has a beam with maximum signal quality, in the cell set as the target cell, or determines a beam, that has maximum signal quality, in the beam set as the target beam. Or the terminal determines at least one of a cell set or a beam set according to the signal strength and the signal quality of the at least one beam, and the first signal strength threshold and the first signal quality threshold; and the terminal determines a cell, that has maximum signal strength and signal quality, in the cell set as the target cell, or determines a cell, that has a beam with maximum signal strength and signal quality, in the cell set as the target cell, or determines a beam, that has maximum signal strength and signal quality, in the beam set as the target beam.

Optionally, as an embodiment, the method further includes that: before the terminal determines the measurement quantity of the at least one beam, the terminal determines that a signal strength of a cell serving the terminal is less than the second signal strength threshold, or that signal quality of a cell serving the terminal is less than the second signal quality threshold, or that a signal strength of a cell serving the terminal is less than the second signal strength threshold and signal quality of a cell serving the terminal is less than the second signal quality threshold, or the terminal determines that a signal strength of a beam serving the terminal is less than the second signal strength threshold, or that signal quality of a beam serving the terminal is less than the second signal quality threshold, or that a signal strength of a beam serving the terminal is less than the second signal strength threshold and signal quality of a beam serving the terminal is less than the second signal quality threshold.

It is to be understood that at least one of the second signal strength threshold or the second signal quality threshold may be preset and may also be configured for the terminal by the network device. At least one of the second signal strength threshold or the second signal quality threshold may also be sent to the terminal by the network device through the measurement configuration information. There are no specific limits made thereto in the disclosure.

Figure 4:
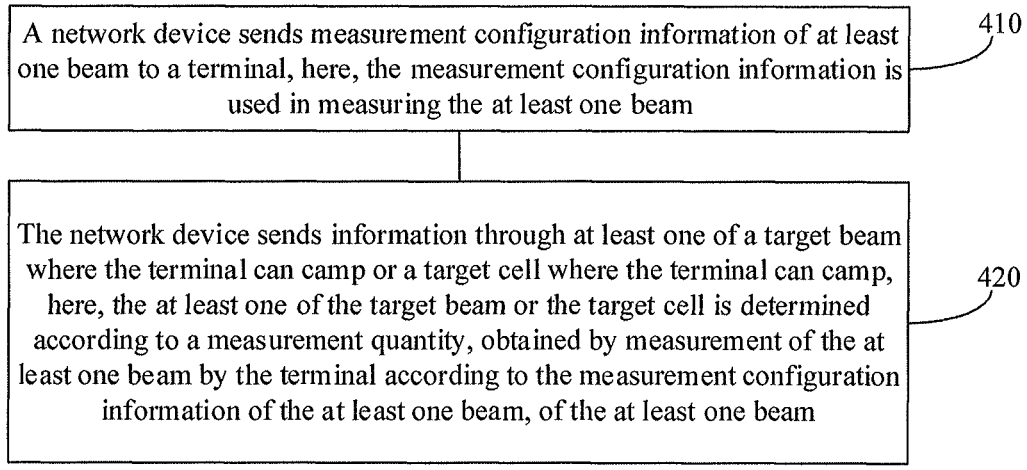
FIG. 4 is a schematic flowchart of a method for beam measurement according to another embodiment of the disclosure.

FIG. 4 is a schematic flowchart of a method for beam measurement according to another embodiment of the disclosure. The method illustrated in FIG. 4 corresponds to the method illustrated in FIG. 3. For simplicity, specific details will not be elaborated herein. The method illustrated in FIG. 4 includes the following operations.

In 410, a network device sends measurement configuration information of at least one beam to a terminal, here, the measurement configuration information is used in measuring the at least one beam.

In 420, the network device sends information through at least one of a target beam where the terminal can camp or a target cell where the terminal can camp, here, the at least one of the target beam or the target cell is determined according to a measurement quantity, obtained by measurement of the at least one beam by the terminal according to the measurement configuration information of the at least one beam, of the at least one beam.

Specifically, the network device sends the information through the at least one of the target beam or the target cell may refer to that the network device sends the information in a broadcast manner through the at least one of the target beam or the target cell, may also refer to that the network device sends the information to the terminal through the at least one of the target beam or the target cell and may also refer to that the network device communicates with the terminal through the at least one of the target beam or the target cell.

Optionally, as an embodiment, the at least one beam belongs to a same cell.

Optionally, as an embodiment, the at least one beam comprises multiple beams and the multiple beams belong to multiple cells.

Optionally, as an embodiment, the measurement configuration information includes at least one of: a frequency priority, a first signal strength threshold, a first signal quality threshold, a second signal strength threshold, or a second signal quality threshold, here, the frequency priority is used to indicate a priority of a frequency of a beam or a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

Optionally, as an embodiment, the network device sends the measurement configuration information of the at least one beam to the terminal includes that: the network device sends dedicated signaling to the terminal, here, the dedicated signaling includes the measurement configuration information of the at least one beam.

Optionally, as an embodiment, the network device sends the measurement configuration information of the at least one beam to the terminal includes that: the network device sends system information to the terminal, here, the system information includes the measurement configuration information of the at least one beam.

The methods for beam measurement according to the embodiments of the disclosure are described above in combination with FIG. 1 to FIG. 4 in detail. Devices for beam measurement according to the embodiments of the disclosure will be described below in combination with FIG. 5 to FIG. 8 in detail. It is to be understood that the device illustrated in FIG. 5 and FIG. 7 may implement each operation in FIG. 3 and the device illustrated in FIG. 6 and FIG. 8 may implement each operation in FIG. 4. For avoiding repetitions, no more elaborations will be made herein.

Figure 5:
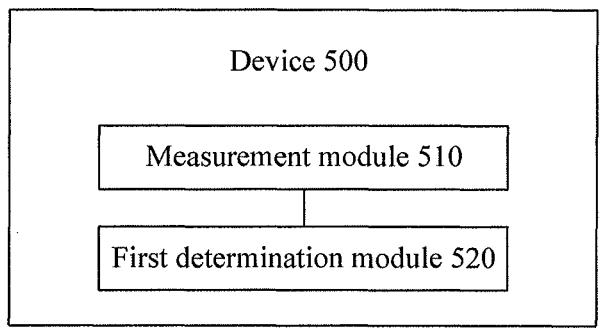
FIG. 5 is a schematic block diagram of a device for beam measurement according to an embodiment of the disclosure.

FIG. 5 is a schematic block diagram of a device for beam measurement according to an embodiment of the disclosure. The device 500 illustrated in FIG. 5 includes a measurement module 510 and a first determination module 520.

The measurement module 510 is configured to measure at least one beam according to measurement configuration information, here, the measurement configuration information is used in measuring the at least one beam.

The first determination module 520 is configured to determine at least one of a target beam where the terminal can camp or a target cell where the terminal can camp, according to a measurement quantity of the at least one beam.

Optionally, as an embodiment, the device further includes a receiving module, configured to receive the measurement configuration information sent by a network device.

Optionally, as an embodiment, the at least one beam belongs to a same cell.

Optionally, as an embodiment, the at least one beam comprises multiple beams and the multiple beams belong to multiple cells.

Optionally, as an embodiment, the first determination module is specifically configured to: determine measurement quantities of the multiple cells according to measurement quantities of the multiple beams; and determine the target cell from the multiple cells according to the measurement quantities of the multiple cells.

Optionally, as an embodiment, the device further includes a second determination module, configured to determine the target beam from the beams in the target cell according to the measurement quantities of the beams in the target cell.

Optionally, as an embodiment, the device further includes a third determination module, configured to determine at least one of: at least one backup beam where the terminal can camp when the target beam is not suitable or at least one backup cell where the terminal can camp when the target cell is not suitable, according to the measurement quantity of the at least one beam.

Optionally, as an embodiment, the first determination module is specifically configured to determine the at least one of the target beam or the target cell according to at least one of signal strength or signal quality of the at least one beam.

Optionally, as an embodiment, the first determination module is further specifically configured to determine a beam, that has a maximum signal strength, of the at least one beam according to the signal strength of the at least one beam, here, the beam that has the maximum signal strength is the target beam, or determine a beam, that has maximum signal quality, of the at least one beam according to the signal quality of the at least one beam, here, the beam that has the maximum signal quality is the target beam, or determine a beam, that has maximum signal strength and signal quality, of the at least one beam according to the signal strength and the signal quality of the at least one beam, here, the beam that has the maximum signal strength and signal quality is the target beam.

Optionally, as an embodiment, the measurement configuration information includes at least one of: a frequency priority, a first signal strength threshold, a first signal quality threshold, a second signal strength threshold, or a second signal quality threshold, here, the frequency priority is used to indicate a priority of a frequency of a beam or a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

Optionally, as an embodiment, the first determination module is further specifically configured to determine the at least one of the target beam or the target cell according to the at least one of the signal strength or the signal quality of the at least one beam, and at least one of the first signal strength threshold or the first signal quality threshold.

Optionally, as an embodiment, the first determination module is further specifically configured to: determine at least one of a cell set or a beam set according to the signal strength of the at least one beam and the first signal strength threshold; and determine a cell, that has a maximum signal strength, in the cell set as the target cell, or determines a cell, that has a beam with a maximum signal strength, in the cell set as the target cell, or determine a beam, that has a maximum signal strength, in the beam set as the target beam, or determine at least one of a cell set or a beam set according to the signal quality of the at least one beam and the first signal quality threshold; and determine a cell, that has maximum signal quality, in the cell set as the target cell, or determines a cell, that has a beam with maximum signal quality, in the cell set as the target cell, or determine a beam, that has maximum signal quality, in the beam set as the target beam, or determine at least one of a cell set or a beam set according to the signal strength and the signal quality of the at least one beam, and the first signal strength threshold and the first signal quality threshold; and determine a cell, that has maximum signal strength and signal quality, in the cell set as the target cell, or determines a cell, that has a beam with maximum signal strength and signal quality, in the cell set as the target cell, or determine a beam, that has maximum signal strength and signal quality, in the beam set as the target beam.

Optionally, as an embodiment, the first determination module is further specifically configured to: determine a cell set or a beam set according to the signal strength of the at least one beam and the first signal strength threshold; and sort cells in the cell set according to a criterion and determine the target cell according to a sorting result, or sort beams in the beam set according to a criterion and determine the target beam according to a sorting result, or determine a cell set or the beam set according to the signal quality of the at least one beam and the first signal quality threshold; and sort cells in the cell set according to a criterion and determine the target cell according to a sorting result, or sort beams in the beam set according to a criterion and determine the target beam according to a sorting result, or determine a cell set or a beam set according to the signal strength and the signal quality of the at least one beam, and the first signal strength threshold and the first signal quality threshold; and sort cells in the cell set according to a criterion and determine the target cell according to a sorting result, or sort beams in the beam set according to a criterion and determine the target beam according to a sorting result.

Optionally, as an embodiment, the first determination module is further configured to: determine a cell set or a beam set according to the signal strength of the at least one beam and the first signal strength threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams, or determine a cell set or a beam set according to the signal quality of the at least one beam and the first signal quality threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams, or determine a cell set or a beam set according to the signal strength and the signal quality of the at least one beam and the first signal strength threshold and the first signal quality threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams.

Optionally, as an embodiment, the device further includes a fourth determination module, configured to determine that a signal strength of a cell serving the terminal is less than the second signal strength threshold, or that signal quality of a cell serving the terminal is less than the second signal quality threshold, or that a signal strength of a cell serving the terminal is less than the second signal strength threshold and signal quality of a cell serving the terminal is less than the second signal quality threshold. Or the fourth determination module is further configured to determine that a signal strength of a beam serving the terminal is less than the second signal strength threshold, or that signal quality of a beam serving the terminal is less than the second signal quality threshold, or that a signal strength of a beam serving the terminal is less than the second signal strength threshold and signal quality of a beam serving the terminal is less than the second signal quality threshold.

Optionally, as an embodiment, the receiving module is specifically configured to receive dedicated signaling sent by the network device, here, the dedicated signaling includes the measurement configuration information of each of the at least one beam.

Optionally, as an embodiment, the receiving module is specifically configured to receive system information sent by the network device, here, the system information includes the measurement configuration information of each of the at least one beam.

Figure 6:
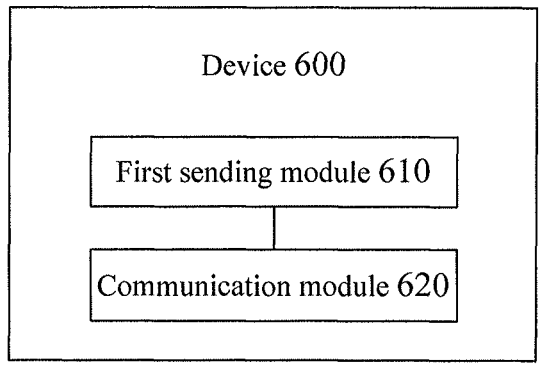
FIG. 6 is a schematic block diagram of a device for beam measurement according to an embodiment of the disclosure.

FIG. 6 is a schematic block diagram of a device for beam measurement according to an embodiment of the disclosure. The device 600 illustrated in FIG. 6 includes a first sending module 610 and a communication module 620.

The first sending module 610 is configured to send measurement configuration information of at least one beam to a terminal, here, the measurement configuration information is used in measuring the at least one beam.

The communication module 620 is configured to send information through at least one of a target beam where the terminal camp or a target cell where the terminal can camp, here, the at least one of the target beam or the target cell is determined according to a measurement quantity, obtained by measurement of the at least one beam by the terminal according to the measurement configuration information of the at least one beam, of the at least one beam.

Optionally, as an embodiment, the at least one beam belongs to a same cell.

Optionally, as an embodiment, the at least one beam comprises multiple beams and the multiple beams belong to multiple cells.

Optionally, as an embodiment, the measurement configuration information includes at least one of: a frequency priority, a first signal strength threshold, a first signal quality threshold, a second signal strength threshold, or a second signal quality threshold, here, the frequency priority is used to indicate a priority of a frequency of a beam or a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

Optionally, as an embodiment, the communication module is specifically configured to send dedicated signaling to the terminal, here, the dedicated signaling includes the measurement configuration information of the at least one beam.

Optionally, as an embodiment, the communication module is further specifically configured to send system information to the terminal, here, the system information includes the measurement configuration information of the at least one beam.

Figure 7:
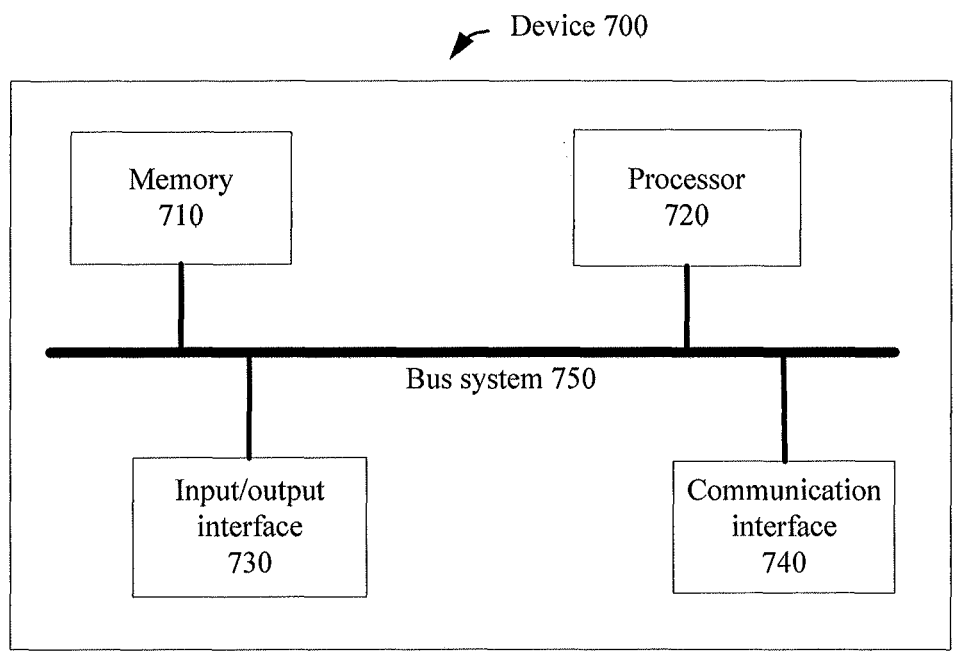
FIG. 7 is a schematic block diagram of a device for beam measurement according to an embodiment of the disclosure.

FIG. 7 is a schematic block diagram of a device for beam measurement according to an embodiment of the disclosure. The device 700 for beam measurement illustrated in FIG. 7 includes a memory 710, a processor 720, an input/output interface 730, a communication interface 740 and a bus system 750. The memory 710, the processor 720, the input/output interface 730 and the communication interface 740 are connected through the bus system 750. The memory 710 is configured to store an instruction. The processor 720 is configured to execute the instruction stored in the memory 720 to control the input/output interface 730 to receive input data and information and output data such as an operation result and control the communication interface 740 to send a signal.

The processor 720 is configured to measure at least one beam according to measurement configuration information, here, the measurement configuration information is used in measuring the at least one beam.

The processor 720 is further configured to determine at least one of a target beam where the terminal camp or a target cell where the terminal can camp, according to a measurement quantity of the at least one beam.

It is to be understood that in the embodiment of the disclosure, the processor 720 may adopt a universal Central Processing Unit (CPU), a microprocessor, an Application Specific Integrated Circuit (ASIC) or one or more integrated circuits, and is configured to execute a related program to implement the technical solution provided in the embodiment of the disclosure.

It is also to be understood that the communication interface 740 uses, for example, but not limited to, a transceiver device such as a transceiver to implement communication between the device 700 and another device or a communication network.

The memory 710 may include a Read-Only Memory (ROM) and a Random Access Memory (RAM) and provides an instruction and data for the processor 720. A part of the memory 710 may further include a nonvolatile RAM. For example, the memory 710 may further store information of a device type.

The bus system 750 includes a data bus, and may further include a power bus, a control bus, a state signal bus and the like. However, for clear description, various buses in the figure are marked as the bus system 750.

In an implementation process, each operation of the method may be completed by an integrated logic circuit of hardware in the processor 720 or an instruction in a software form. The operations of the method for beam measurement disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 710. The processor 720 reads information in the memory 710 and completes the operations of the method in combination with hardware. No more detailed descriptions will be made herein to avoid repetitions.

Optionally, as an embodiment, the communication interface is configured to receive the measurement configuration information sent by a network device.

Optionally, as an embodiment, the at least one beam belongs to a same cell.

Optionally, as an embodiment, the at least one beam comprises multiple beams and the multiple beams belong to multiple cells.

Optionally, as an embodiment, the processor is specifically configured to determine measurement quantities of the multiple cells according to measurement quantities of the multiple beams and determine the target cell from the multiple cells according to the measurement quantities of the multiple cells.

Optionally, as an embodiment, the processor is configured to determine the target beam from the beams in the target cell according to the measurement quantities of the beams in the target cell.

Optionally, as an embodiment, the processor is configured to determine at least one of: at least one backup beam where the terminal can camp when the target beam is not suitable or at least one backup cell where the terminal can camp when the target cell is not suitable, according to the measurement quantity of the at least one beam.

Optionally, as an embodiment, the processor is specifically configured to determine the at least one of the target beam or the target cell according to at least one of signal strength or signal quality of the at least one beam.

Optionally, as an embodiment, the processor is further specifically configured to: determine a beam, that has a maximum signal strength, of the at least one beam according to the signal strength of the at least one beam, here, the beam that has the maximum signal strength is the target beam, or determine a beam, that has maximum signal quality, of the at least one beam according to the signal quality of the at least one beam, here, the beam that has the maximum signal quality is the target beam, or determine a beam, that has maximum signal strength and signal quality, of the at least one beam according to the signal strength and the signal quality of the at least one beam, here, the beam that has the maximum signal strength and signal quality is the target beam.

Optionally, as an embodiment, the measurement configuration information includes at least one of: a frequency priority, a first signal strength threshold, a first signal quality threshold, a second signal strength threshold, or a second signal quality threshold, here, the frequency priority is used to indicate a priority of a frequency of a beam or a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

Optionally, as an embodiment, the processor is further specifically configured to determine the at least one of the target beam or the target cell according to at least one of the signal strength or the signal quality of the at least one beam, and at least one of the first signal strength threshold or the first signal quality threshold.

Optionally, as an embodiment, the processor is further specifically configured to: determine at least one of a cell set or a beam set according to the signal strength of the at least one beam and the first signal strength threshold; and determine a cell, that has a maximum signal strength, in the cell set as the target cell, or determines a cell, that has a beam with a maximum signal strength, in the cell set as the target cell, or determine a beam, that has a maximum signal strength, in the beam set as the target beam, or determine at least one of a cell set or a beam set according to the signal quality of the at least one beam and the first signal quality threshold; and determine a cell, that has maximum signal quality, in the cell set as the target cell, or determines a cell, that has a beam with maximum signal quality, in the cell set as the target cell, or determine a beam, that has maximum signal quality, in the beam set as the target beam, or determine at least one of a cell set or a beam set according to the signal strength and the signal quality of the at least one beam, and the first signal strength threshold and the first signal quality threshold; and determine a cell, that has maximum signal strength and signal quality, in the cell set as the target cell, or determines a cell, that has a beam with maximum signal strength and signal quality, in the cell set as the target cell, or determine a beam, that has maximum signal strength and signal quality, in the beam set as the target beam.

Optionally, as an embodiment, the processor is further specifically configured to: determine a cell set or a beam set according to the signal strength of the at least one beam and the first signal strength threshold; and sort cells in the cell set according to a criterion and determine the target cell according to a sorting result, or sort beams in the beam set according to a criterion and determine the target beam according to a sorting result, or determine a cell set or the beam set according to the signal quality of the at least one beam and the first signal quality threshold; and sort cells in the cell set according to a criterion and determine the target cell according to a sorting result, or sort beams in the beam set according to a criterion and determine the target beam according to a sorting result, or determine a cell set or a beam set according to the signal strength and the signal quality of the at least one beam and the first signal strength threshold and the first signal quality threshold; and sort cells in the cell set according to a criterion and determine the target cell according to a sorting result, or sort beams in the beam set according to a criterion and determine the target beam according to a sorting result.

Optionally, as an embodiment, the processor is further configured to: determine a cell set or a beam set according to the signal strength of the at least one beam and the first signal strength threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams, or determine a cell set or a beam set according to the signal quality of the at least one beam and the first signal quality threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams, or determine a cell set or a beam set according to the signal strength and the signal quality of the at least one beam, and the first signal strength threshold and the first signal quality threshold; and determine the target cell from the cell set according to frequency priorities or determine the target beam from the beam set according to frequency priorities, here, the frequency priorities are used to indicate frequency priorities of frequencies of the cells or frequency priorities of frequencies of the beams.

Optionally, as an embodiment, the processor is further configured to determine that a signal strength of a cell serving the terminal is less than the second signal strength threshold, or that signal quality of a cell serving the terminal is less than the second signal quality threshold, or that a signal strength of a cell serving the terminal is less than the second signal strength threshold and signal quality of a cell serving the terminal is less than the second signal quality threshold. Or the processor is further configured to determine that a signal strength of a beam serving the terminal is less than the second signal strength threshold, or that signal quality of a beam serving the terminal is less than the second signal quality threshold, or that a signal strength of a beam serving the terminal is less than the second signal strength threshold and signal quality of a beam serving the terminal is less than the second signal quality threshold.

Optionally, as an embodiment, the communication interface is specifically configured to receive dedicated signaling sent by the network device, here, the dedicated signaling includes the measurement configuration information of each of the at least one beam.

Optionally, as an embodiment, the communication interface is further specifically configured to receive system information sent by the network device, here, the system information includes the measurement configuration information of each of the at least one beam.

Figure 8:
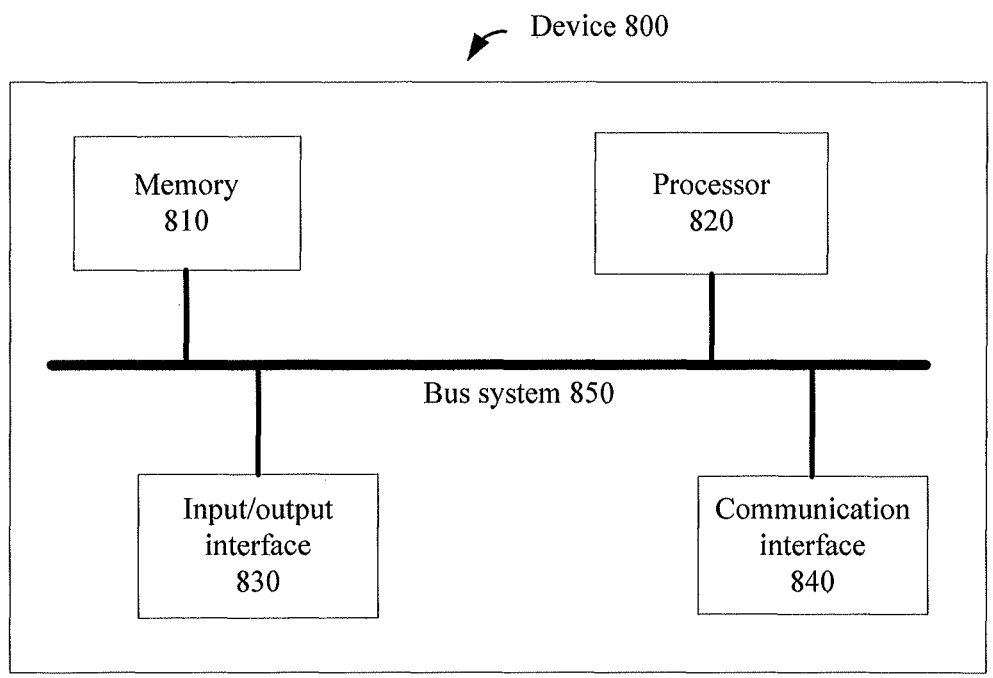
FIG. 8 is a schematic block diagram of a device for beam measurement according to an embodiment of the disclosure.

FIG. 8 is a schematic block diagram of a device for beam measurement according to an embodiment of the disclosure. FIG. 8 is the schematic block diagram of the device for beam measurement according to the embodiment of the disclosure. The device 800 for beam measurement illustrated in FIG. 8 includes a memory 810, a processor 820, an input/output interface 830, a communication interface 840 and a bus system 850. The memory 810, the processor 820, the input/output interface 830 and the communication interface 840 are connected through the bus system 850. The memory 810 is configured to store an instruction. The processor 820 is configured to execute the instruction stored in the memory 820 to control the input/output interface 830 to receive input data and information and output data such as an operation result and control the communication interface 840 to send a signal.

The communication interface 840 is configured to send measurement configuration information of at least one beam to a terminal, here, the measurement configuration information is used in measuring the at least one beam.

The communication interface 840 is further configured to send information through at least one of a target beam where the terminal can camp or a target cell where the terminal can camp, here, the at least one of the target beam or the target cell is determined according to a measurement quantity, obtained by measurement of the at least one beam by the terminal according to the measurement configuration information of the at least one beam, of the at least one beam.

It is to be understood that in the embodiment of the disclosure, the processor 820 may adopt a universal CPU, a microprocessor, an ASIC or one or more integrated circuits, and is configured to execute a related program to implement the technical solution provided in the embodiment of the disclosure.

It is also to be understood that the communication interface 840 uses, for example, but not limited to, a transceiver device such as a transceiver to implement communication between the signal detection device 800 and another device or a communication network.

The memory 810 may include a ROM and a RAM and provides an instruction and data for the processor 820. A part of the memory 810 may further include a nonvolatile RAM. For example, the memory 810 may further store information of a device type.

The bus system 850 includes a data bus, and may further include a power bus, a control bus, a state signal bus and the like. However, for clear description, various buses in the figure are marked as the bus system 850.

In an implementation process, each operation of the method may be completed by an integrated logic circuit of hardware in the processor 820 or an instruction in a software form. The operations of the method for beam measurement disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 810. The processor 820 reads information in the memory 810 and completes the operations of the method in combination with hardware. No more detailed descriptions will be made herein to avoid repetitions.

Optionally, as an embodiment, the at least one beam belongs to a same cell.

Optionally, as an embodiment, the at least one beam comprises multiple beams and the multiple beams belong to multiple cells.

Optionally, as an embodiment, the measurement configuration information includes at least one of: a frequency priority, a first signal strength threshold, a first signal quality threshold, a second signal strength threshold, or a second signal quality threshold, here, the frequency priority being configured to indicate a priority of a frequency of a beam or a frequency of a cell, the first signal strength threshold is used to indicate a minimum threshold of signal strength required for signal transmission of a beam, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

Optionally, as an embodiment, a communication module is specifically configured to send dedicated signaling to the terminal, here, the dedicated signaling includes the measurement configuration information of the at least one beam.

Optionally, as an embodiment, the communication module is further specifically configured to send system information to the terminal, here, the system information including the measurement configuration information of the at least one beam.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for beam measurement, comprising:
  measuring, by a terminal, at least one beam according to measurement configuration information, the measurement configuration information being used in measuring the at least one beam and the measurement configuration information comprising a measurement identifier (ID) and a first signal strength threshold, wherein the measurement ID corresponds to an ID of the at least one beam and the first signal strength threshold is used to indicate a minimum threshold of signal strength required for signal transmission of a beam, wherein the at least one beam comprises a plurality of beams and the plurality of beams belong to a plurality of cells; and
  determining, by the terminal according to signal strength of the at least one beam and the first signal strength threshold, a target cell where the terminal can camp, wherein the target cell is a cell with a highest number of beams of which the signal strength meets the first signal strength threshold.

2. The method of claim 1, further comprising:
receiving, by the terminal, the measurement configuration information sent by a network device.

3. The method of claim 1, further comprising:
determining, by the terminal according to the signal strength of the at least one beam, at least one backup cell where the terminal can camp when the target cell is not suitable.

4. The method of claim 1, wherein the measurement configuration information further comprises at least one of:
a frequency priority, a first signal quality threshold, a second signal strength threshold, or a second signal quality threshold,
wherein the frequency priority is used to indicate a priority of a frequency of a beam or of a frequency of a cell, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

5. The method of claim 4, further comprising: before determining, by the terminal, the signal strength of the at least one beam,
determining, by the terminal, that a signal strength of a cell serving the terminal is less than the second signal strength threshold, or that signal quality of a cell serving the terminal is less than the second signal quality threshold, or that a signal strength of a cell serving the terminal is less than the second signal strength threshold and signal quality of a cell serving the terminal is less than the second signal quality threshold; or
determining, by the terminal, that a signal strength of a beam serving the terminal is less than the second signal strength threshold, or that signal quality of a beam serving the terminal is less than the second signal quality threshold, or that a signal strength of a beam serving the terminal is less than the second signal strength threshold and signal quality of a beam serving the terminal is less than the second signal quality threshold.

6. The method of claim 1, wherein determining, by the terminal, the target cell according to the signal strength of the at least one beam and the first signal strength threshold comprises:
determining, by the terminal, a cell set according to the signal strength of the at least one beam and the first signal strength threshold; and determining, by the terminal, a cell, that has a maximum signal strength, in the cell set as the target cell, or determining a cell, that has a beam with a maximum signal strength, in the cell set as the target cell.

7. A method for beam measurement, comprising:
sending, by a network device, measurement configuration information of at least one beam to a terminal, the measurement configuration information being used in measuring the at least one beam and the measurement configuration information comprising a measurement identifier (ID) and a first signal strength threshold, wherein the measurement ID corresponds to an ID of the at least one beam and the first signal strength threshold is used to indicate a minimum threshold of signal strength required for signal transmission of a beam, wherein the at least one beam comprises a plurality of beams and the plurality of beams belong to a plurality of cells; and
sending, by the network device, information through a target cell where the terminal can camp, the target cell being determined according to signal strength, obtained by measurement of the at least one beam by the terminal according to the measurement configuration information of the at least one beam, of the at least one beam and the first signal strength threshold, wherein the target cell is a cell with a highest number of beams of which the signal strength meets the first signal strength threshold.

8. The method of claim 7, wherein the measurement configuration information further comprises at least one of:
a frequency priority, a first signal quality threshold, a second signal strength threshold, or a second signal quality threshold,
wherein the frequency priority is used to indicate a priority of a frequency of a beam or of a frequency of a cell, the first signal quality threshold is used to indicate a minimum value of signal quality required for signal transmission of a beam, the second signal strength threshold is used to indicate a threshold at which the terminal starts measuring a beam and the second signal quality threshold is used to indicate a threshold at which the terminal starts measuring a beam.

9. A device for beam measurement, comprising:
a processor; and
a memory storing instructions that, when executed by the processor, cause the processor to
measure at least one beam according to measurement configuration information, the measurement configuration information being used in measuring the at least one beam and the measurement configuration information comprising a measurement identifier (ID) and a first signal strength threshold, wherein the measurement ID corresponds to an ID of the at least one beam and the first signal strength threshold is used to indicate a minimum threshold of signal strength required for signal transmission of a beam, wherein the at least one beam comprises a plurality of beams and the plurality of beams belong to a plurality of cells; and
determine a target cell where a terminal can camp, according to signal strength of the at least one beam and the first signal strength threshold, wherein the target cell is a cell with a highest number of beams of which the signal strength meets the first signal strength threshold.

10. The device of claim 9, further comprising:
a communication interface, configured to receive the measurement configuration information sent by a network device.

11. The device of claim 10, wherein the communication interface is configured to:
receive dedicated signaling sent by the network device, the dedicated signaling comprising the measurement configuration information of each of the at least one beam; or
receive system information sent by the network device, the system information comprising the measurement configuration information of each of the at least one beam.

12. The device of claim 9, wherein the processor is configured to determine, according to the signal strength of the at least one beam, at least one backup cell where the terminal can camp on when the target cell is not suitable.

13. The device of claim 9, wherein the measurement configuration information further comprises at least one of:
- a frequency priority, a first signal quality threshold, a second signal strength threshold, or a second signal quality threshold,
- wherein the frequency priority is used to indicate a priority of a frequency of a beam or a frequency of a cell, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

14. The device of claim 9, wherein the processor is configured to:
- determine a cell set according to the signal strength of the at least one beam and the first signal strength threshold; and determine a cell, that has a maximum signal strength, in the cell set as the target cell, or determine a cell, that has a beam with a maximum signal strength, in the cell set as the target cell.

15. The device of claim 9, wherein the processor is configured to:
- determine a cell set according to the signal strength of the at least one beam and the first signal strength threshold; and sort cells in the cell set according to a criterion and determine the target cell according to a sorting result;
- or, the processor is configured to:
- determine a cell set according to the signal strength of the at least one beam and the first signal strength threshold; and determine the target cell from the cell set according to frequency priorities, the frequency priorities being used to indicate frequency priorities of frequencies of the cells.

16. A device for beam measurement, comprising:
- a communication interface, configured to send measurement configuration information of at least one beam to a terminal, the measurement configuration information being used in measuring the at least one beam and the measurement configuration information comprising a measurement identifier (ID) and a first signal strength threshold, wherein the measurement ID corresponds to an ID of the at least one beam and the first signal strength threshold is used to indicate a minimum threshold of signal strength required for signal transmission of a beam, wherein the at least one beam comprises a plurality of beams and the plurality of beams belong to a plurality of cells; and
- send information through a target cell where the terminal can camp, the target cell being determined according to signal strength, obtained by measurement of the at least one beam by the terminal according to the measurement configuration information of the at least one beam, of the at least one beam and the first signal strength threshold, wherein the target cell is a cell with a highest number of beams of which the signal strength meets the first signal strength threshold.

17. The device of claim 16, wherein the measurement configuration information further comprises at least one of:
- a frequency priority, a first signal quality threshold, a second signal strength threshold, or a second signal quality threshold,
- wherein the frequency priority is used to indicate a priority of a frequency of a beam or of a frequency of a cell, the first signal quality threshold is used to indicate a minimum threshold of signal quality required for signal transmission of a beam, the second signal strength threshold is used to indicate a threshold at which the terminal starts measuring a beam and the second signal quality threshold is used to indicate a threshold at which the terminal starts measuring a beam.

* * * * *